United States Patent [19]

Craig, Jr.

[11] Patent Number: 4,953,882
[45] Date of Patent: Sep. 4, 1990

[54] TRANSMISSION APPARATUS FOR BICYCLE OR LIKE PEDAL-OPERATED VEHICLE

[76] Inventor: Chester L. Craig, Jr., 3460 Cuervo La., Yuma, Ariz. 85365

[21] Appl. No.: 330,185

[22] Filed: Mar. 29, 1989

[51] Int. Cl.⁵ .............................................. B62M 1/04
[52] U.S. Cl. ................................... 280/258; 280/216; 280/236
[58] Field of Search ................ 280/252, 253, 255, 258, 280/254, 256, 257, 216, 236

[56] References Cited

U.S. PATENT DOCUMENTS

| | | | |
|---|---|---|---|
| 587,837 | 8/1897 | Latimer | 280/258 |
| 4,227,712 | 10/1980 | Dick | 280/258 |
| 4,630,839 | 12/1986 | Seol | 280/255 |

*Primary Examiner*—David M. Mitchell
*Attorney, Agent, or Firm*—Larson and Taylor

[57] ABSTRACT

A pedal driven vehicle is provided wherein up and down movement of a pair of pedals is converted into rotary motion of a drive wheel to provide vehicle locomotion. A chain or belt connected at the ends thereof to the pedals is movable back and forth in opposite directions in response to the up and down movement of the pedals and a power transmission mechanism, driven by the chain or belt, converts the back and forth motion thereof into rotary motion used in providing rotation of the driven wheel. The transmission includes first and second driven shafts, a sprocket assembly driven by the chain for providing rotation of the first and second driven shafts in opposite directions in response to downward movement of respective pedals of the pair of pedals, and intermediate gearing for converting rotation of a first one of the shafts in a first direction into rotation of the other, output shaft in the opposite direction so that the output shaft is caused to rotate in the same direction irrespective of which pedal is pressed downward.

10 Claims, 4 Drawing Sheets

TRANSMISSION APPARATUS FOR BICYCLE OR LIKE PEDAL-OPERATED VEHICLE

FIELD OF THE INVENTION

The present invention relates to a transmission apparatus or mechanism for converting the up and down movement of pedals or the like into unidirectional rotational motion for powering a bicycle or like pedal-operated transportation vehicle.

BACKGROUND OF THE INVENTION

While conventional bicycles and like vehicular devices convert the rotary motion of the pedals into rotary movement of the drive wheel of the bicycle, i.e., through a chain and sprocket drive, significant efficiencies can be obtained by using the up and down motion of pedals to provide the motive power for a bicycle. However, the complexities of converting such pedal movements into rotary motion have discouraged progress in the development of a practical, commercially marketable bicycle (or like vehicle) utilizing an up and down pedal movement as the basic source of motive power for the bicycle.

SUMMARY OF THE INVENTION

Generally speaking, the present invention is concerned with the provision of a pedal driven vehicle which incorporates a practical, yet highly effective transmission system for converting the up and down movement of the vehicle pedals into rotational movement of a drive wheel of the vehicle to thereby provide vehicle locomotion. Although the invention is described below in connection with a bicycle, the invention has many other applications including use in a pedal-powered helicopter.

In accordance with the invention, a pedal driven vehicle is provided which comprises: a frame; at least one driven wheel mounted on the frame for, when driven, providing locomotion of the frame; first and second pedals mounted on the frame so as to move up and down alternately, in tandem; an elongate flexible drive member (e.g., a drive chain or belt) connected at the ends thereof to the two pedals and movable back and forth in opposite directions in response to the up and down movement of the pedals; and transmission means, connected between the drive member and the driven wheel and driven by said drive member, for converting the back and forth motion of the drive member into rotary motion used in providing rotation of the driven wheel, the transmission means including first and second driven shafts, means driven by the drive member for providing rotation of the first and second driven shafts in opposite directions in response to downward movement of respective pedals of the first and second pedals, and means for converting rotation of one of the shafts in a first direction into rotation of the other, output shaft in the opposite direction so that, irrespective of which pedal is moved downward, i.e., depressed, the other, output shaft is caused to rotate in the same direction, and output means driven by the output shaft and operatively connected to the driven wheel to provide rotation thereof.

In accordance with a preferred embodiment of the invention, a vehicle transmission pedal driven vehicle is provided wherein the up and down movement of a pair of vehicle pedals is converted into rotational movement of a drive wheel of the vehicle, the vehicle comprising:

ratcheting sprocket means driven by the up and down movement of the vehicle pedals and comprising a first ratcheting sprocket which provides power transmission when rotated in a first direction and which provides no power transmission when rotated in a second, opposite direction and a second sprocket, connected to said first sprocket for rotation therewith, which provides power transmission when rotated in said second direction and which provides no power transmission when rotated in said first direction;

a first, outer, hollow shaft connected to said first sprocket;

a second, inner shaft mounted within said first hollow shaft concentrically thereof and connected to said second sprocket;

means for connecting said first and second sprockets to the pedals of the vehicle in such a manner that downward movement of a first pedal of said pair of pedals provides rotation of the first and second sprockets in the aforesaid first direction so that power is transmitted to the first shaft from the first sprocket and no power is transmitted to the second shaft from the second sprocket, and that downward movement of the other pedal of the pair of pedals provide rotation of the sprockets in the second, opposite direction so that power is transmitted to the second shaft from the second sprocket while no power is transmitted to the first shaft from the first sprocket; output means driven by said second shaft;

intermediate gearing means connected between the first shaft and the output means for converting rotary motion of the the sprocket in the first direction into rotary motion of the output means in the second opposite direction so that rotation of both of said sprockets in a direction which provides power transmission results in rotation of the output means in the same direction; and means, connected between said output means and the drive wheel of the vehicle, for converting rotational movement of the output means into rotational movement of the drive wheel.

Preferably, the intermediate gearing means comprises a first gear located on the outer shaft, a gear carrying member mounted on the vehicle adjacent to the outer shaft and carrying a second gear in engagement with said first gear, a further gear carrying member mounted on the vehicle and carrying a third gear in engagement with the second gear so as to rotate in the opposite direction from the second gear, and a fourth gear mounted on the first shaft in engagement with the third gear.

In one advantageous embodiment, the means for converting the rotational movement of the output means into rotational movement of the vehicle drive wheel comprises a pulley drive system. Preferably, the output means includes a drive gear mounted on the second shaft and a pulley member driven by the drive gear.

In accordance with an advantageous aspect of this embodiment of the invention, the pulley drive system comprises a variable speed centrifugal pulley drive system including a plate member driven in rotation by the drive gear mounted on the second shaft, an endless drive belt, and a variable diameter pulley comprising a plurality of drive belt support members. The drive belt is looped around one end of the support members and the latter are mounted on the plate member so as to move radially outwardly as the rotational speed of the plate member increases, thereby increasing the diameter of the pulley and thus increasing the speed of the pulley drive system.

The plate member preferably includes a plurality of generally radially extending slots therein arranged in substantially equispaced relation around the center of the plate member, and the support members preferably comprise generally wedge shaped members mounted on the plate and movable radially along the slots. A biassing means, e.g., in the form of a circumferential band or spring or a plurality of radial springs connected between pairs of said members, exerts a biassing force on said members which acts in opposition to the centrifugal forces exerted during rotation of the plate.

A tensioning control means is advantageously mounted on said vehicle and operatively connected to said drive belt for maintaining the tension on said drive belt when the diameter of the variable diameter pulley changes.

In accordance with a further advantageous embodiment, the output means comprises a hydraulic gear pump driven by the first shaft and the means for converting the rotational movement of the output means into rotational movement of the vehicle drive wheel comprises a hydraulic motor driven by the gear pump.

Other features and advantages of the invention will be set forth in, or apparent from, the detailed description of preferred embodiments of the invention which follows.

BRIEF DESCRIPTION OF THE DRAWINGS

FIG. 4 is a perspective view of the transmission of FIGS. 1 to 3;

DESCRIPTION OF THE PREFERRED EMBODIMENTS

Figure 1:
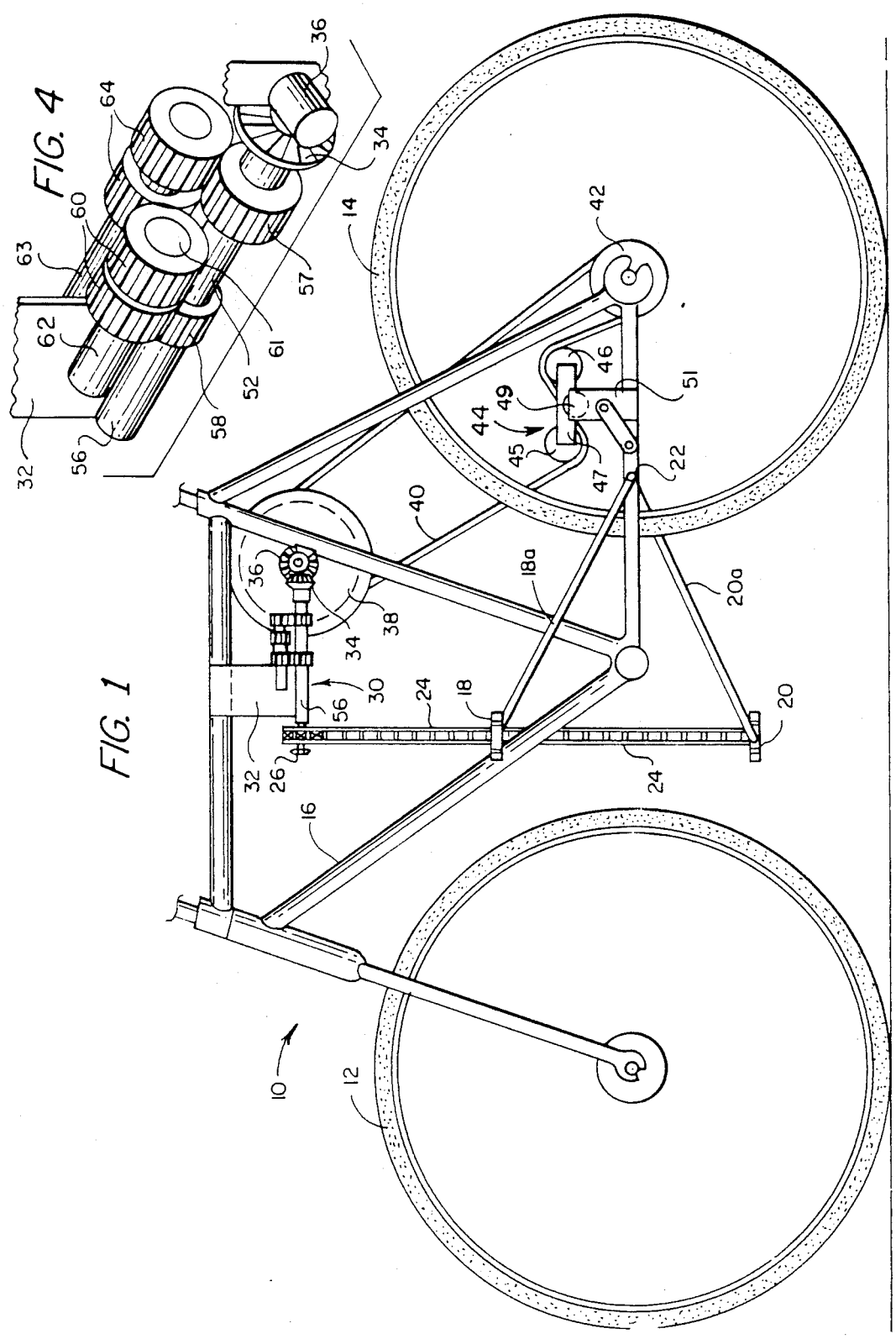
FIG. 1 is a side elevational view, partially broken away, of bicycle incorporating the transmission system of the invention.

Referring to FIG. 1, a bicycle incorporating the power transmission system of the invention is generally indicated at 10. Apart from the power transmissions system to be described, bicycle 10 is completely conventional and thus will not be described in any detail. Accordingly, considering the major components thereof, bicycle 10 includes a front wheel 12, a rear wheel 14 and a frame 16 on which wheels 12 and 14 are mounted.

Figure 2:
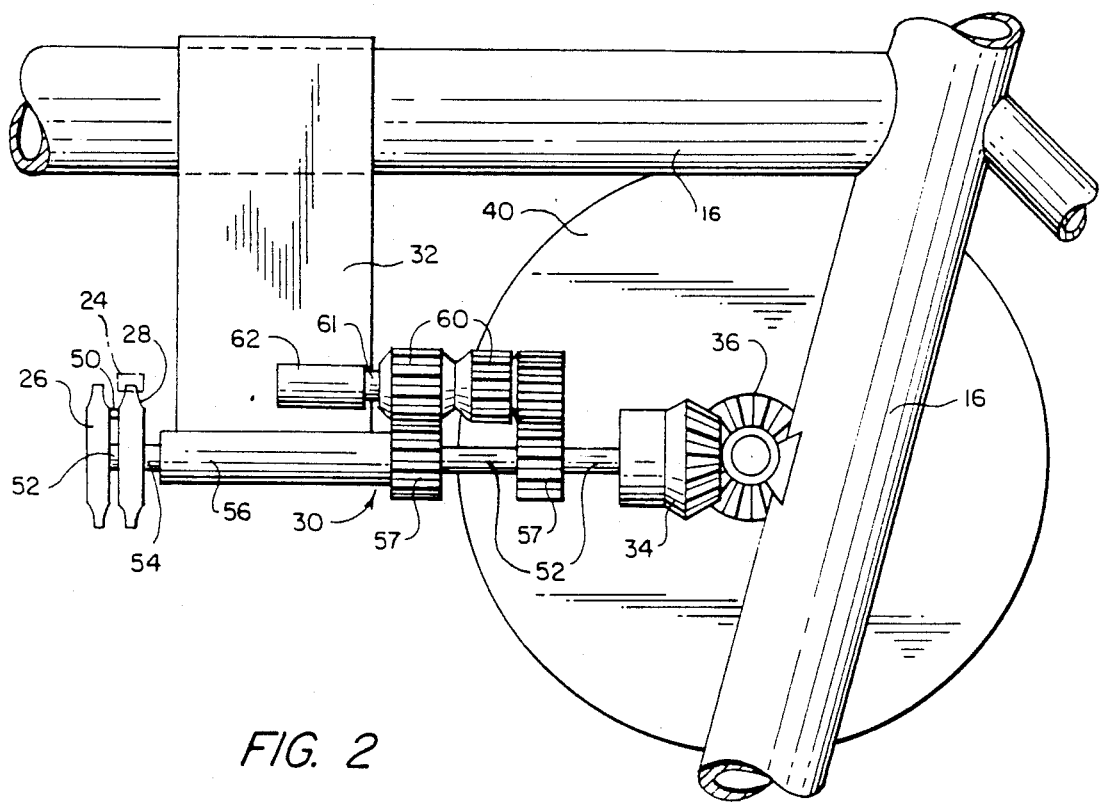
FIG. 2 is a detail, to an enlarged scale and in side elevation, of the transmission system of FIG. 1.
Figure 3:
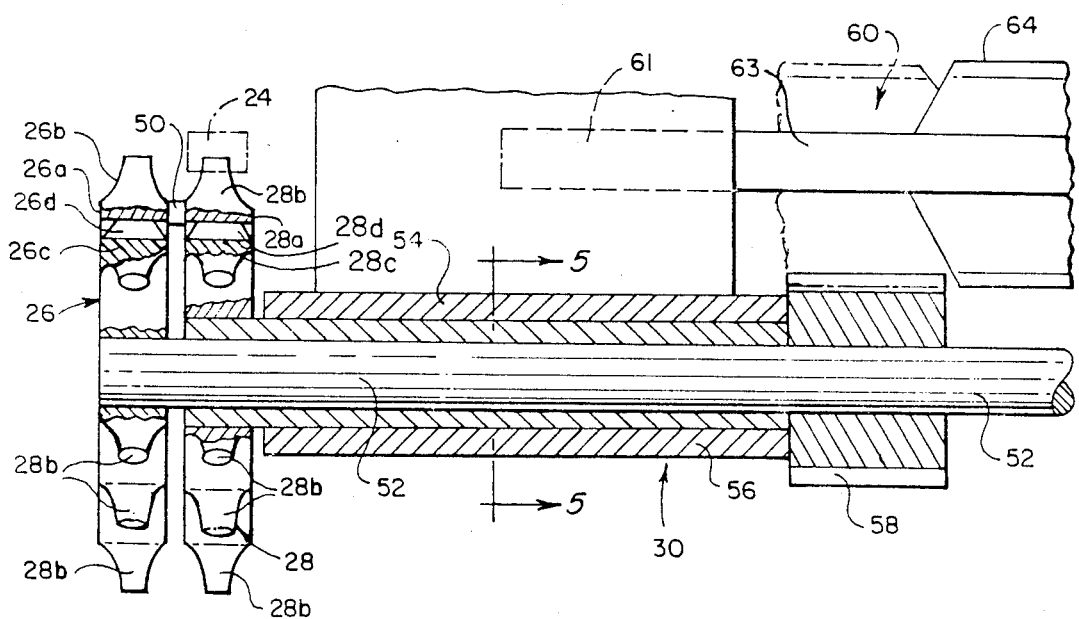
FIG. 3 is detail, to a further enlarged scale, partially broken away and partially in section, of important components of the transmission of FIGS. 1 and 2.

Bicycle 10 is of the type in which power is generated by an up and down pedal action and to this end, a pair of pedals 18 and 20 are connected by corresponding elongate support arms 18a and 20a to pivot mount 22 on frame 16. The location of pivot mount 22 on frame 16, and the common length of support arms 16a, 16b, are such that the pedal action provided is down and up rather than rotary. This kind of pedal action is, of course, a conventional alternative to the more common rotary action. Pedals 18 and 20 are interconnected by a drive chain 24 a central portion of which is trained or looped over one sprocket, a pair of single direction ratcheting bicycle type sprockets 26 and 28 (see also FIGS. 2 and 3) of a power transmission arrangement generally noted 30. More specifically, as indicated in FIGS. 2 and 3 when taken with FIG. 1 chain 24 extends upwardly from pedal 18, is trained over and around inner sprocket 28, and extends down to pedal 20. As explained below, sprockets 26 and 28 are connected together to rotate as a unit and thus it is basically a matter of choice as to which sprocket is engaged by chain 24.

The single direction ratcheting sprockets 26 and 28, are conventional in construction and, as indicated schematically in FIG. 3, include outer rings 26a and 28a containing ratchet teeth 26b and 28b and inner rings 26c and 28c (shown in the left hand upper portion of FIG. 3 wherein the outer ring is broken away) coupled to the outer rings by conventional ratchet mechanisms 26d and 28d. These ratcheting mechanisms act in the opposite direction so that when power is applied to sprocket 28 by pressing down on one of the pedals 18 or 20, so as to provide rotation of the ganged sprockets 26, 28 in a first direction one of the sprockets 26 or 28 will slip, so that no power is transmitted thereby. Similarly, when the other pedal is depressed the other sprocket 28 or 26 will slip and will not transmit power.

Before considering the constructional details of the power transmission arrangement of FIGS. 2 to 5, the remaining components of the overall drive system will be discussed in connection FIG. 1. As illustrated, the power transmission arrangement 30 is mounted by a downwardly depending support bracket 32 on an upper frame member of frame 16. As is also illustrated in FIG. 2, an output gear 34 of power transmission arrangement 30 meshes with a drive gear 36 mounted on an inclined frame member of frame 16 and secured to a variable speed centrifugal pulley 38. Pulley 38 is connected by a multigroove V-belt 40 to a further pulley 42 connected to the rear wheel 14 such that rotation of pulley 38 provides rotation of rear wheel 14. Centrifugal pulley 38 is described in more detail below in connection with FIGS. 6 to 8 and, as is described, expands in response to the centrifugal forces acting thereon as the speed thereof increases. This expansion increases the effective diameter of the pulley 38 and thereby increases the potential speed transmitted to the remainder of the drive system and ultimately to wheel 14.

In order to take up the slack created in belt 40 when the diameter of the pulley 38 decreases from and expanded state, there is provided a spring-loaded belt tensioner, or take-up idler arrangement, indicated schematically at 44. This arrangement or assembly includes a pair of idlers 45 and 46 around which belt 40 passes, and, in operation prevents slackness in belt 40 from causing problems in transmission of the power drive to wheel 14. Idlers 45 and 46 are mounted for rotation on a common mounting member 47 pivotably supported on a spring-loaded pivot shaft 49 supported by a support member 51 on frame 16. The take-up idler arrangement 44 is basically conventional and other conventional slack take-up devices or techniques ca be used so that additional discussion of this arrangement is not seen to be necessary.

Figure 5:
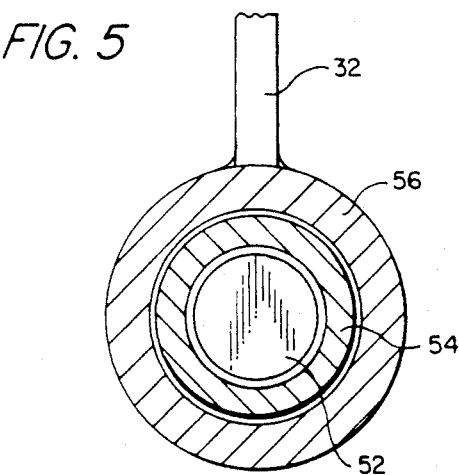
FIG. 5 is a transverse cross through a portion of the transmission of FIGS. 1 to 4.

Referring to FIGS. 2 to 5, the details of the power transmission arrangement 30 of FIG. 1 are shown. As mentioned above and as is best seen in FIGS. 2 and 3, sprockets 26 and 28 are ganged or linked together, e.g., by brazing, as indicated schematically by a connecting link 50, so that the sprockets 26, 28 rotate together. As is shown in FIGS. 2 and 3, sprocket 26 is mounted on one end of a central solid shaft 52 while sprocket 28 is mounted on a hollow concentric shaft 54 which surrounds shaft 52. As shown in FIGS. 2 and 5, shafts 52 and 54 are supported by mounting bracket or mount 32 by means of an outer concentric tubular support member 56 which is secured to the bottom of mount 32 and in which concentric shafts 52, 54 are received.

Referring particularly to FIGS. 2 and 4, solid central shaft 52 is directly connected to output gear 34 so that clockwise rotation of shaft 52 provides clockwise rotation of gear 34. A further drive gear 57 is mounted on solid shaft 52 in spaced relationship to output gear 34 which serves the function described below.

Outer hollow shaft 54 is directly connected to or otherwise supports a sprocket gear 58, at opposite end thereof from sprocket 28, which rotates with shaft 54 independently of the solid shaft 52. Sprocket gear 58 meshes with one-half of a double section idler gear 60 carried by gear carrying shaft 62 mounted for rotation in a shaft holder 64 secured to one side of mounting bracket 32. A further shaft 63 (see FIGS. 3 and 4), mounted for rotation in a corresponding shaft holder (not shown) secured to the opposite side of mounting bracket 32 from holder 62, carries a further double section idler gear 64. As is best seen in FIG. 4 (and is also shown in FIG. 3 wherein gear 60 is shown in dashed lines), the proximal or inboard one-half of gear 64 meshes with the distal or outboard one-half of gear 60, whereas, as shown in FIGS. 2 and 4, the distal or outboard one-half of gear 64 meshes with the gear 57 mounted on central solid shaft 52. Thus, rotation of outer concentric shaft 54, in response to power being transmitted thereto from sprocket 28, ultimately causes rotation of inner shaft 52 carrying output gear 34, and, as will be explained, causes rotation of inner shaft 52 in the same direction as the normal direction of rotation thereof, despite the fact the direction of rotation of outer shaft 54 is opposite that of inner shaft 52.

Considering in more detail the operation of the power transmission, which is best understood from the showings in FIGS. 2 and 4, it will be assumed for purposes of illustration that sprocket 26 transmits power to shaft 52 when rotated clockwise while sprocket 28 transmits power to shaft 54 when rotated counterclockwise. Further, keeping in mind that in the illustrated embodiment downward movement of pedal 18 will cause, through the action of chain 24, ganged sprockets 26 and 28 to turn clockwise, it will be understood that such clockwise rotation will be directly imparted to output gear 34 through the corresponding rotation of inner solid shaft 52 and will thus cause rotation of gear 36 and associated pulley 38 to drive belt 40 and ultimately turn wheel 14. During this downward, power stroke of pedal 28, sprocket 28 slips or ratchets relative outer shaft 54 so that shaft 54 does not rotate.

Turning now to the power stroke of the opposite pedal, downward movement of pedal 20 will cause, through the action of chain 24, counterclockwise rotation of ganged sprockets 26, 28 and thus cause rotation of hollow outer concentric shaft 54. As mentioned above, the purpose of the intermediate gearing between shaft 54 and output gear 34 is to provide conversion of this counterclockwise rotation of shaft 54 into clockwise rotation of output gear 34 so as to provide the same drive sequence for causing rotation of wheel 14. This is accomplished as follows: counterclockwise rotation of gear 58 causes clockwise rotation of gear 60 which, in turn, causes counterclockwise rotation of gear 64 which, in turn, causes clockwise rotation of gear 57 and thus of output gear 34.

Figure 6:
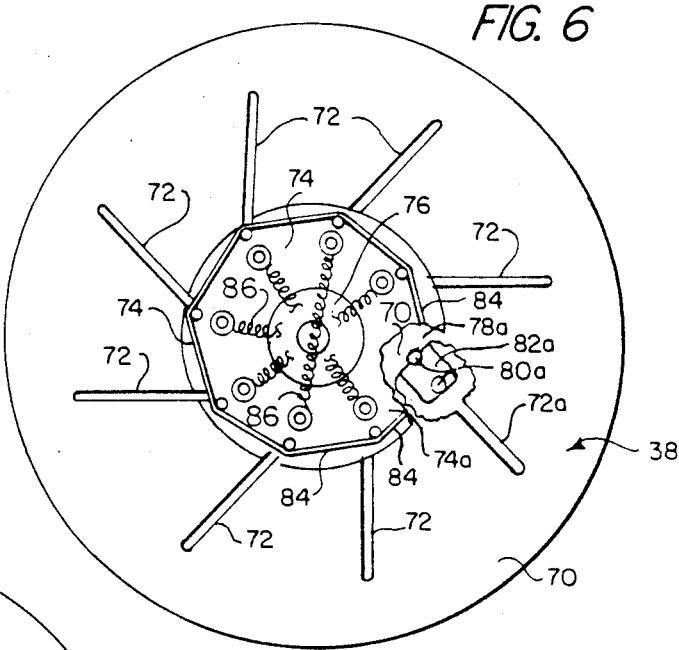
FIGS. 6 to 8 are side elevational views of a variable speed centrifugal pulley constructed in accordance with a further aspect of the invention, showing three different steps during the operation thereof.
Figure 7:
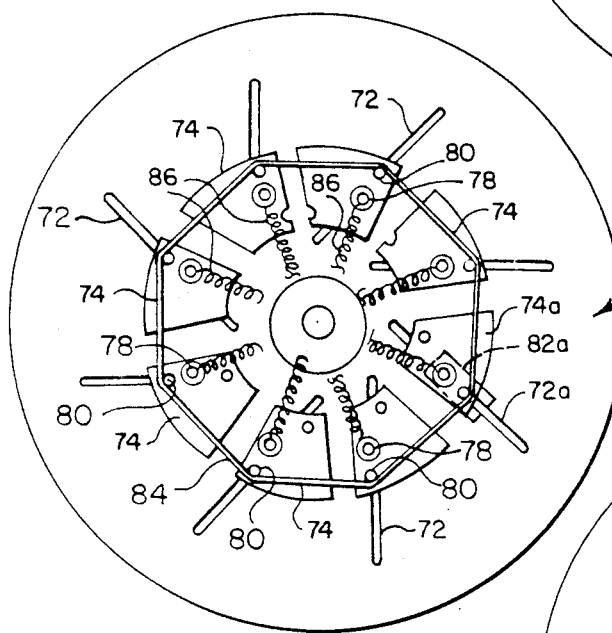
Figure 8:
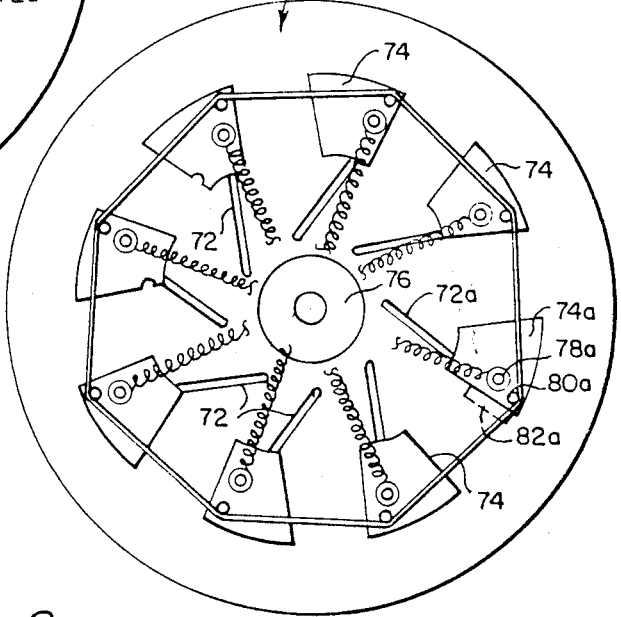

Turning now to a fuller consideration of variable speed centrifugal pulley 38 and referring particularly to FIGS. 6 to 8 which shown three stages of operation of the pulley and in which the belt 40 has been eliminated for purposes of clarity. As illustrated, pulley 38 comprises a generally circular plate or disc 70 having a plurality of slots 72 formed therein. Slots 72 are arranged in equally spaced relationship in repeating pattern wherein individual slots are disposed so as to extend generally radially although being offset at small angle from the radial direction, as illustrated. A plurality of truncated wedges 74 are disposed around a central hub 76, the inner edges of the wedges 74 being shaped to match u with and fit snugly against a portion of the circumferential edge of hub 76.

Each wedge 74 includes a pair of posts or rods 78 and 80 which extend outwardly therefrom on opposite sides thereof. As is illustrated in the broken away portion of FIG. 6 and in dashed lines in FIGS. 7 and 8, as well as in FIG. 9 which is a fragmentary side view of a portion of pulley 38, for a typical wedge, denoted 74a, the inwardly extending portions of posts 78a and 80a extend through the corresponding slot 72a in wedge 70a and are secured to a small, generally rectangular retaining member 82a so as to permit wedge 74a to slide along slot 72a while being retained in place on disc 38 by retaining plate 82a. The oppositely extending portions of posts 78a and 80b serve functions now to be described.

A resilient retainer band 84 extends around the circumference of the wedges 74 in engagement with the outwardly extending portions of outermost posts 80 so as to bias the wedges towards hub 76 and to retain wedges 74 in snug engagement with hub 76 in the rest position of the pulley. In addition, a plurality of generally radially extending springs 86 are connected between pairs of the outwardly extending portions of the inner posts 78, i.e., between the posts 78 of radially oppositely disposed wedges 74, so as to bias these wedges radially inwardly towards central hub 76. It will be appreciated that the radially inwardly acting biasing forces on wedges 74 can be varied by varying the tension of retainer band 84 and, or springs 86, and that, depending on the forces to be exerted, one or the other or both of these approaches can be used.

Figure 9:
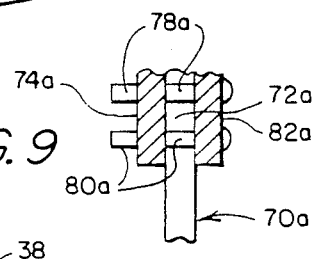
FIG. 9 is a fragmentary detail of a portion of the pulley of FIGS. 6 to 8, in the position shown in FIG. 6.
Figure 10:
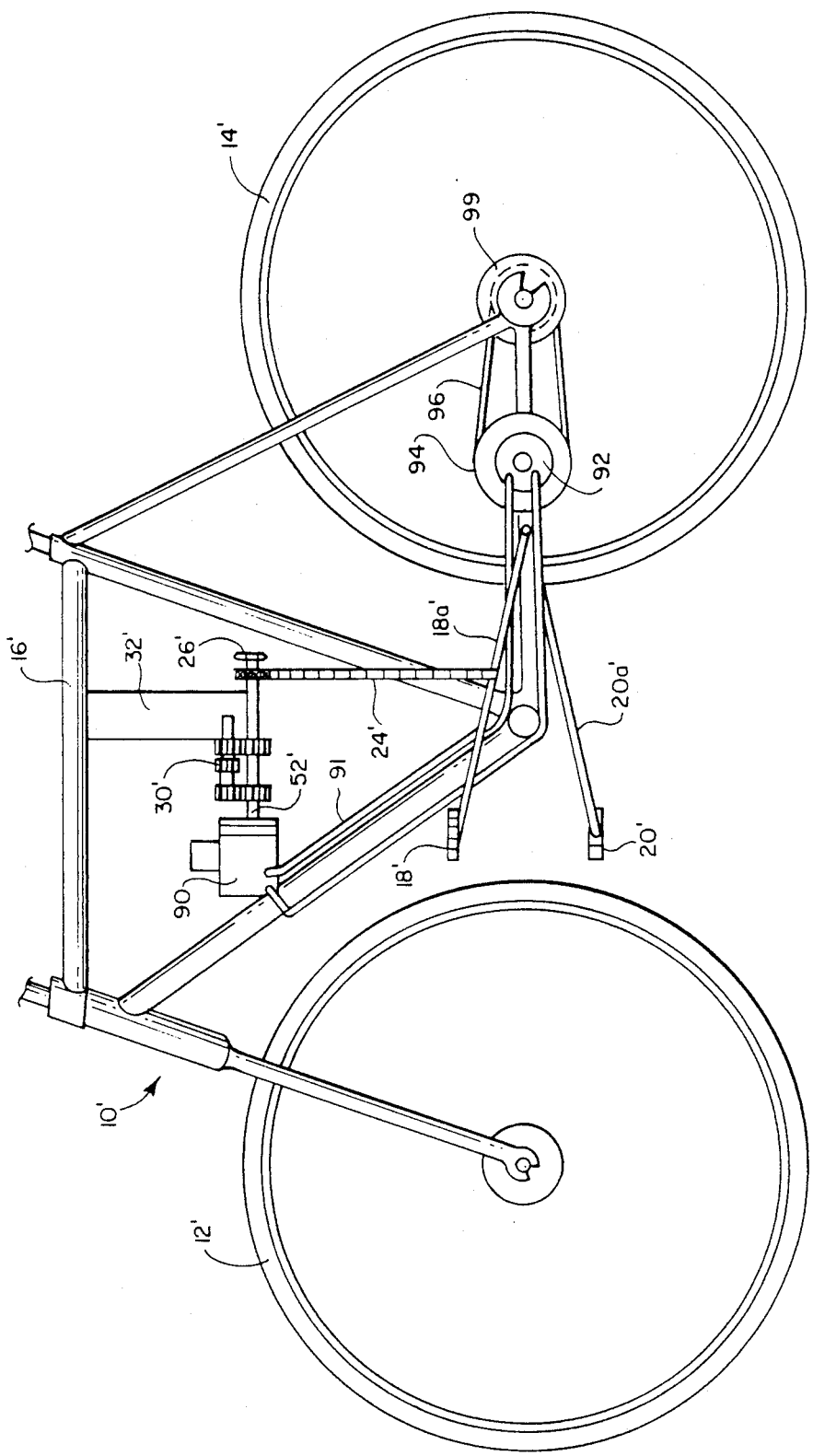
FIG. 10 is a side elevational view of a bicycle incorporating a further embodiment of the invention.

Referring to FIG. 10, a further embodiment of the invention is shown which uses a hydraulic drive. This embodiment is generally similar to that of FIGS. 1 to 9 and like elements have been given the same reference numerals with primes attached so that the wheels are denoted 12' and 14' and the frame 16'. The key components of the embodiment of FIG. 9 are a hydraulically powered steering pump 90, which is mounted on frame 16' and is connected to, and driven by, the output end of shaft 52, and a hydraulic motor 92, which is mounted on a different portion of frame 16, which is connected to pump 90 by hydraulic pressure (pressure and return) lines 91 and which powers the drive sprocket 94 of a chain drive including a chain 96 and a driven sprocket 98 secured to rear wheel 14'. Thus, power supplied from the pedals 18', 20' through transmission 30' as described above is used to turn pump 90. The resultant pressure produced by pump 92 is transmitted through one of the pressure lines 91 to cause motor 94 to turn so as to drive sprocket 96 and ultimately turn wheel 12'.

Although the present invention has been described relative to exemplary embodiments thereof, it will be understood by those skilled in the art that variations and modifications can be effected in these exemplary embodiments without departing from the scope and spirit of the invention.

What is claimed is:

1. A pedal driven vehicle comprising:
   a frame;
   at least one driven wheel mounted on said frame for, when driven, providing locomotion of the frame;
   first and second pedals mounted on the frame so as to move up and down alternately, in tandem;
   an elongate flexible drive chain disposed in a plane perpendicular to the plane of the frame and connected at the ends thereof to said pedals and movable back and forth in opposite directions in response to the up and down movement of the pedals, and
   transmission means, connected between the drive chain and the driven wheel and driven by said drive chain, for converting the back and forth motion of the drive chain into rotary motion used in providing rotation of said driven wheel, said transmission means including first and second concentric driven shafts extending parallel to the longitudinal axis of the frame, means driven by said drive chain for providing rotation of said first and second driven shafts in opposite directions in response to downward movement of respective pedals of the first and second pedals, and means for converting rotation of one of said shafts in a first direction into rotation of the other shaft in the opposite direction so that irrespective of which pedal is moved downward said other shaft is caused to rotate in the same direction, and output means driven by said other shaft and operatively connected to said driven wheel to provide rotation thereof.

2. A transmission system for a pedal driven vehicle for converting the up and down movement of a pair of vehicle pedals into rotational movement of a drive wheel of the vehicle, said transmission system including:
   ratcheting means driven by the up and down movement of the vehicle pedals and comprising a first ratcheting member which provides power transmission when rotated in a first direction and which provides no power transmission when rotated in a second, opposite direction and a second ratcheting member, connected to said first member for rotation therewith, which provides power transmission when rotated in said second direction and which provides no power transmission when rotated in said first direction;
   a first outer, hollow shaft connected to one of said members;
   a second, inner shaft mounted within said first hollow shaft concentrically thereof and connected to the other of said members;
   means for connecting said first and second members to the pedals of the vehicle in such a manner that downward movement of a first pedal of said pair of pedals provides rotation of said first and second members in said first direction so that power is transmitted to said first shaft from said one member and no power is transmitted to said second shaft from said other member and downward movement of the other pedal of said pair of pedals provide rotation of said members in said second, opposite direction so that power is transmitted to said second shaft from said other member while no power is transmitted to said first shaft from said one member;
   output means driven by said second shaft;
   intermediate gearing means connected between said first shaft and said output means for converting rotary motion of said one member in said first direction into rotary motion of said output means in the second, opposite direction so that rotation of both of said members in a direction which provides power transmission results in rotation of said output means in the same direction; and means, connected between said output means and the drive wheel of the vehicle, for converting rotational movement of the output means into rotational movement of said drive wheel.

3. A pedal driven vehicle as claimed in claim 2 wherein said intermediate gearing means comprises a first gear located on said outer shaft, a gear carrying member mounted on said vehicle adjacent said outer shaft and carrying a second gear in engagement with said first gear, a further gear carrying member mounted on said vehicle and carrying a third gear in engagement with said second gear so as to rotate in the opposite direction from said second gear and a fourth gear mounted on said first shaft in engagement with said third gear.

4. A pedal driven vehicle as claimed in claim 2 wherein said means for converting the rotational movement of the output means into rotational movement of the vehicle drive wheel comprises a pulley drive system.

5. A pedal driven vehicle as claimed in claim 4 wherein said output means includes a drive gear mounted on said second shaft and a pulley member driven by said drive gear.

6. A pedal driven vehicle as claimed in claim 4 wherein said pulley drive system comprises a variable speed centrifugal pulley drive system including a plate member driven in rotation by the drive gear mounted on said second shaft, an endless drive belt, and a variable diameter pulley comprising a plurality of drive belt support members around which one end of said drive belt is looped to provide support thereof and mounted on said plate member so as to move radially outwardly as the rotational speed of said plate member increases thereby increasing the diameter of the pulley and thus increasing the speed of the pulley drive system.

7. A pedal driven vehicle as claimed in claim 5 wherein said plate member includes a plurality of generally radially extending slots therein arranged in substantially equispaced relation around the center of the plate member and said support members comprise generally wedge shaped members mounted on said plate and movable radially along said slots.

8. A pedal driven vehicle as claimed in claim 7 further comprising biassing means for exerting biassing forces on said wedge shaped members acting in opposition to the centrifugal forces exerted thereon during rotation of said plate member.

9. A pedal driven vehicle as claimed in claim 6, further comprising tensioning means, mounted on said vehicle and operatively connected to said drive belt for maintaining the tension on said drive belt when the diameter of said variable diameter pulley changes.

10. A pedal driven vehicle as claimed in claim 2 wherein said output means comprises a hydraulic gear pump driven by said first shaft and said means for converting the rotational movement of said output means into rotational movement of the vehicle drive wheel comprises a hydraulic motor driven by said gear pump.

* * * * *